Nov. 6, 1962 R. E. HOVDA ET AL 3,062,955
IMPULSE NOISE GENERATOR
Filed Sept. 22, 1959 2 Sheets-Sheet 1
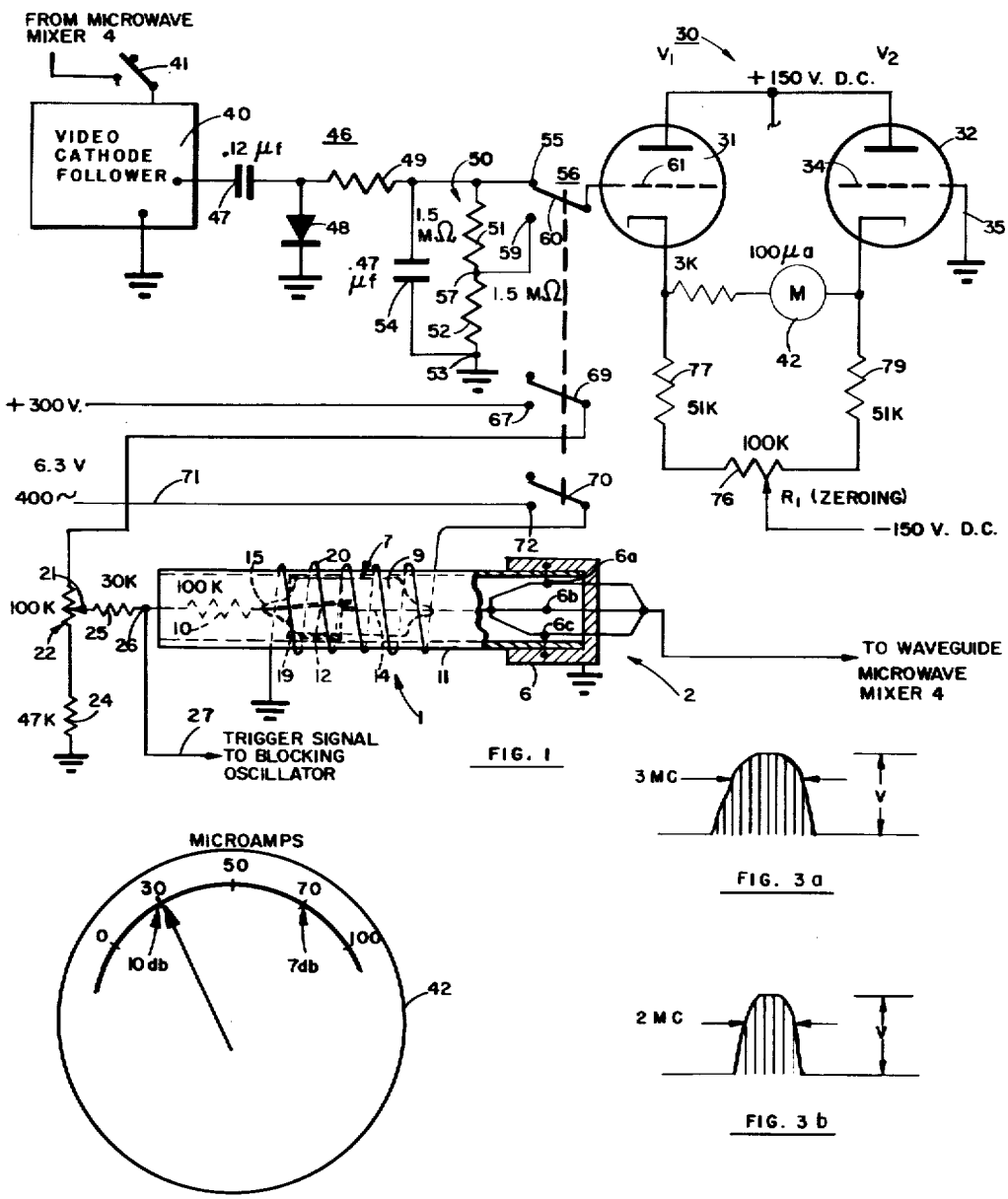
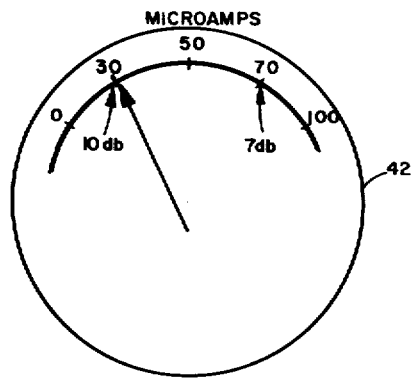
FIG. 2
FIG. 3a
FIG. 3b
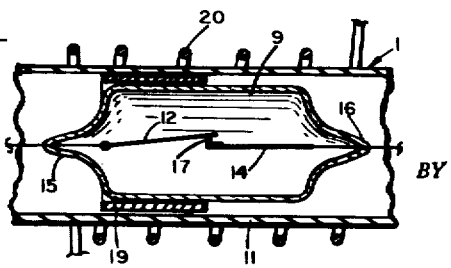
FIG. 5
*INVENTORS*
ROBERT E. HOVDA
REXFORD F. GOODE
ERNEST R. ROEHL
BY
ATTORNEY

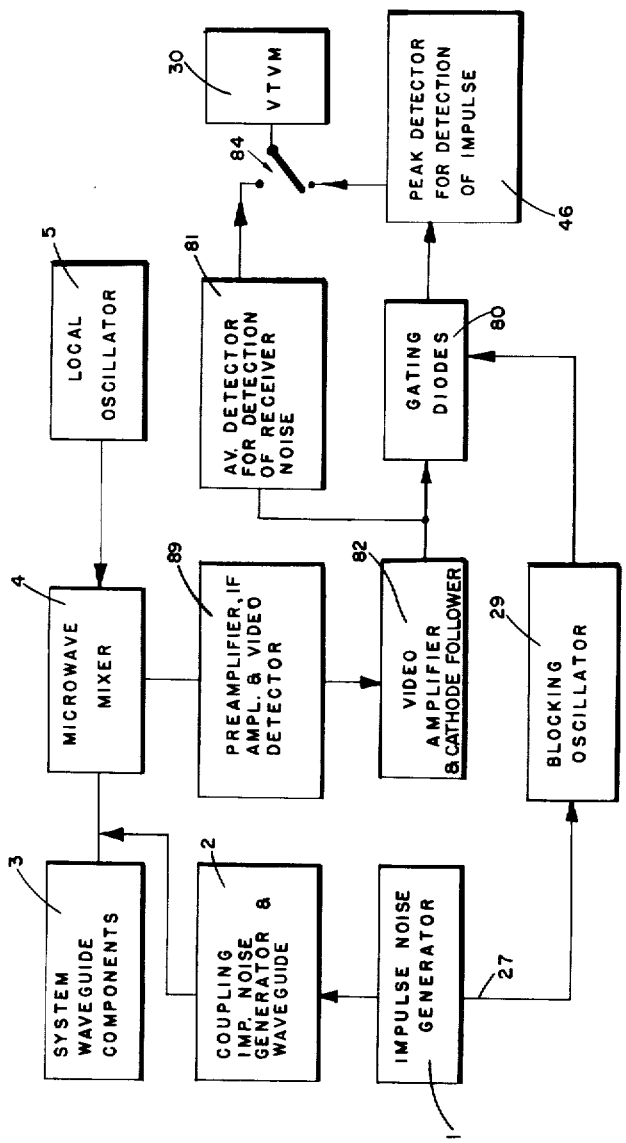

United States Patent Office 3,062,955
Patented Nov. 6, 1962

3,062,955
IMPULSE NOISE GENERATOR
Robert E. Hovda, Buena Park, Rexford F. Goode, La Puente, and Ernest R. Roehl, Norwalk, Calif., assignors to North American Aviation, Inc.
Filed Sept. 22, 1959, Ser. No. 841,537
13 Claims. (Cl. 325—363)

This invention relates to impulse noise generators and particularly to such a generator utilizing a dry reed magnetic switch as the electrical noise source.

The impulse noise generator of the invention is used for determining the useful sensitivity of a radar receiver. Such a receiver must be maintained at peak sensitivity in order to prevent the range of the radar system from excessive degradation. The effective range of a radar system is inversely proportional to the receiver noise figure; i.e., an increase of noise figure from 8 to 11 decibels would have the same effect on system range as if the transmitted power were cut in half. Measurement of the receiver noise figure, or receiver sensitivity, must accordingly be accomplished at frequent intervals in order to maintain the operation of the radar system at its optimum value.

The reduction in range with increase of noise figure is due to the fact, among others, that the presence of electronic interference in the output of a receiver system makes it difficult to receive and understand the signal. Different types of noise will adversely affect signal detection in different ways, depending on the manner in which the final presentation of the information is made available. Interfering signals can reduce perceptibility of the desired signal either by saturating the receiver or by mixing with the wanted signal. Saturation will disable a receiver so that linear response is lost. The mixing of signal and noise will mask the identity of the signal if the noise is sufficiently strong. Generally, the interference or noise is more serious when its characteristics resemble those of the desired signal. In some cases, such noise may be reduced, but since it is not always possible to eliminate interference, it is sometimes necessary to evaluate the performance of a receiver with the noise present. In such cases, calibrated noise generators are needed to determine system performance.

The present invention affords means for checking receiver noise figure which are well suited to airborne service by virtue of being small in size, light in weight, having low power requirements and an extended service life, and adapted to being readily incorporated in existing radar equipment. The noise figure assumes real importance when microwave frequencies are being utilized, as in radar. When only moderately high frequencies are concerned, the useful sensitivity of a receiver is ordinarily limited by extraneous noise originating outside the receiver, as in an electrical storm. At microwave frequencies, however, external noise becomes less important, and the limit on the useful sensitivity is set by noise generated in the receiver itself. It is for this reason that "noise figure," or the relation between the performance of a particular receiver and that of a theoretically perfect receiver, has been adopted as a measure of microwave receiver performance. The increase in noise figure is caused mainly by crystal mixer and preamplifier deterioration, which in the mixer consists of increases in conversion loss and noise temperature.

The method of measuring receiver sensitivity generally used requires the use of equipment such as a signal generator set, which is bulky, power consuming, requires frequent calibration, and which semi-skilled personnel find difficult to operate. Such equipment is suitable for use at ground maintenance stations, but is wholly impractical for airborne use. The standard method of measuring noise figure is to use a gas discharge source with a calibrated attenuator. Since the output of this type of noise generator is too low to couple into the system through a directional coupler, it is seldom used to measure noise figure on systems. It would be necessary to disassemble some waveguide components so that the gas discharge noise output might be connected directly to the mixer. As a result of this inherent inconvenience, such measurements can be made only on the ground, and have been made at infrequent intervals, so that the operation of the radar receivers has been subject to a deterioration in quality and range of significant degree.

Other types of noise source than the dry reed magnetic switch disclosed in detail hereafter have been suggested and used; e.g., a crystal noise source is simple and provides a broad band output, but because the crystal characteristics change considerably and relatively frequently, such a source would require frequent calibration, which is impractical for a built-in device.

Another possible source of noise involves the use of a klystron in a non-oscillatory circuit. A klystron noise generator is unsatisfactory, however, because the noise is narrow in band width, is suspectible to variations due to the regulation of the anode and filament voltages, and is often gassy, making it unreliable. The narrow band width requires a correction factor for receivers of different band widths if they are wider than that of the klystron. If the system local oscillator changes in frequency the cavity of the klystron must be returned. A further disadvantage of using a klystron noise generator lies in its relatively low noise output, requiring a system directional coupler with a coupling value no looser than 15 decibels.

Another known noise source involves the use of a gas discharge tube. Here the noise is generated primarily within the gaseous discharge and is of a stable broad band type. Its stability and predictability to within a few tenths of a decibel has gained it widespread acceptance as a laboratory standard. Its output is, however, so low that a system directional coupling would need to have a value of about 7 decibels, and this value could not be used because 20 percent of the receiver power would be lost in the directional coupling when this system is operating. Another disadvantage is the large physical size and the power requirement, which is on the order of 50 watts.

The present invention comprises a short section of open circuited coaxial transmission line periodically charged through a high reistance and discharged through the characteristic impedance of the transmission line to which it is connected. A dry reed magnetic switch is used as the inner conductor of the coaxial line to produce the electrical noise. Means are provided for peak detecting this noise, and the results are displayed on a meter calibrated in decibels to provide a direct reading of receiver sensitivity. It will be realized that the shielding effect of the outer conductor of the coaxial line prevents the discharge from producing unwanted interference elsewhere in the system, so that it affects only those portions to which it is transmitted through the coaxial connectors.

The frequencies contained in a narrow pulse extend over a range greater than the reciprocal of the pulse width, so that a pulse .0001 microseconds wide contains a frequency distribution beyond 10,000 megacycles.

The pulse width is determined by the time taken for energy to travel from the end of the charged line, connected to the terminated transmission line, to the opposite end, which is connected to the high resistance, and back. This high resistance is effectively an open circuit to the pulse. Hence, to obtain an output with frequency components in the X-band and beyond, it is necessary to make the charged line short. One of the biggest advantages of the impulse generator of this invention is the extremely high amplitude of the noise generated, which, with the embodiment shown hereafter, is in the milliwatt region.

In the past, a disadvantage of impulse generators has been the need for servicing the vibrating contacts used to discharge the length of charged line. With the magnetic dry reed switch here disclosed, long life and reliability has been obtained.

The impulse generator is not an absolute standard, in that the output signal generated is a periodic impulse with none of the properties of "white noise." Although the noise generated by resistive loads is independent of band width, in an impulse noise generator the mathematical equivalent is a function of receiver band width. It should also be noted that if the impulses are detected with a peak detector, the magnitude of the detected peaks should be relatively independent of band width, and may be used to provide a reading directly indicative of receiver sensitivity.

The invention thus has as its primary object the provision of simple and lightweight equipment for testing the noise figure of a radar receiver.

Another object is to provide noise figure testing means of size and weight suitable to be incorporated in airborne radar equipment.

Another object is to enable the frequent testing and adjustment of airborne radar receivers independent of ground test equipment.

A still further object is to make it possible to maintain the range of radar equipment close to its optimum value over a long period of time.

A further object is to relieve the airborne radar equipment of reliance on ground based receiver sensitivity test equipment without the addition of comparable weight and bulk to the airborne equipment.

These and other objects will be apparent from the following drawings in which:

FIG. 1 is a schematic diagram showing a noise generator of the invention connected to equipment with which it is to be used;

FIG. 2 is a front face view of a meter designed to be connected in the circuit of FIG. 1, from which the efficiency of operation of the radar receiver may be read at a glance;

FIGS. 3a and 3b are graphs showing the relation between the noise power present for receivers of different band widths, that shown in FIG. 3a representing a circuit in which the band width is 3 megacycles and that shown in FIG. 3b being one for which the band width is 2 megacycles;

FIG. 4 is a block diagram of a system, with which the circuit of FIG. 1 is to be employed, arranged to permit receiver noise measurement during the presence of jamming signals; and FIG. 5 is an expanded view of a portion of the invention as illustrated in FIG. 1.

In the drawings, the impulse noise generator, generally indicated as 1, is shown feeding through coupling means, generally indicated as 2, into the system waveguide components 3 and the microwave mixer 4. The mixer 4 is also connected to the local oscillator 5. The coupling means 2 here shown comprise three symmetrically spaced coaxial fittings 6a, 6b, and 6c, disposed in a terminal adapter 6 about one end of the impulse noise generator and leading to conventional probe type couplers (not shown) inserted in the narrow walls of the waveguide mixer 4.

The impulse noise generator 1 is a section of coaxial line having as its inner conductor a magnetically actuated dry reed switch 7 sealed in a glass envelope 9 and connected in series with a resistor 10 which, in a typical embodiment, has a value of 100 kilohms. The outer conductor 11 of the coaxial line is a cylindrical metal jacket of conducting material which encloses the switch 7 and resistor 10. Switch 7 employs two dry reeds 12 and 14 formed of soft steel approximately ⅛ inch wide and .020 in thickness. The reeds are mounted by being terminally welded to suitable supporting leads 15 and 16 at opposite ends of the envelope 9, and spaced to overlap in the contact area 17. The reeds may be plated all over with a copper flash. Reed 14, to which the negative side of the charging potential will be applied, is then plated with a .002 inch layer of silver in the contact area 17, over which is plated a .0005 inch outer layer of gold. It has been found that when this plating combination is utilized, the contact area will remain clean for an indefinite period. This represents a great improvement on prior art, in which the contacting elements, usually made of material such as platinum and iridium, require frequent cleaning and adjustment to remove the deposits or pits produced during operation. Various other contact embodiments are well known in the art, but are objectionable as requiring frequent maintenance and adjustment. In contrast, the contacts as shown in the figure have uniformly given a long service life without requiring adjustment after being placed in use.

A member 19 capable of absorbing high frequency electromagnetic energy is also disposed within the outer conductor 11 and surrounding the glass envelope 9 to reduce the effective length of charged line. This gives an impulse output nearly constant with frequency in the X-band. In a particular embodiment in which the dry reed switch is approximately 2.5 inches long, with each contact sealed therein a little longer than 1.25 inches, the absorbing member 19 was introduced between the switch envelope 9 and the outer conductor 11 over about 0.75 inch of the contact area 17 of the charged contact 12. The member 19 was a cylinder 1½ inches long, having an internal diameter of 0.213 and an external diameter of 0.300 inch, of a thermosetting plastic resin of high electrical resistivity.

About the outside of the coaxial line is wound a coil 20 which electromagnetically actuates the dry reed switch 7. The open contacts of the switch are charged and discharged 800 times per second by virtue of the application of 400-cycle voltage to the coil 20, which closes the switch on both halves of the cycle. The capacitance of the line length being charged is no more than 2 mmf., so that the charge time required is short compared to the time available for charging. The charging voltage can be varied by a potentiometer having a control arm 21 in a voltage divider 22 including also a fixed resistance 24, to control the amplitude level of the impulse output. In a particular embodiment the potentiometer section 22 had a resistance of 100 kilohms, whereas the resistance 24 had a value of 47 kilohms. Between the resistor 10 in the switch envelope and control arm 21 is inserted a 30 kilohm resistance 25, from the junction point 26 of which with resistor 10 is taken a trigger or synchronizing signal, through lead 27 to the blocking oscillator 29 as seen in FIG. 4, the use of which will be described later. The characteristic impedance of the transmission line into which the charged length of line is discharged through coupling 2 is approximately 50 ohms. It is necessary to have a direct-current return path for the charging potential in this section of line, which may be provided by a separate lead, not shown, extending through the insulating portions of the line. Alternatively, the separate lead may extend only into contact with the adapter 6, which may be grounded to provide the direct-current return path for the charging potential.

The output of the impulse generator is fed through the output coupler 2 into the system waveguide components and the microwave mixer 4, using means such as probe type couplers, not shown, in the narrow walls of the latter. The impulse output, after passing through the mixer 4, the preamplifier, the IF amplifier and video detector, extends for only a few tenths of a microsecond, so that a peak detector with a short time constant and a long discharge time constant is necessary. With low noise level systems and meters, it is advantageous to use a direct-current amplifier 30 of the vacuum tube voltmeter type having a triode 31 as the means of measuring the noise output of the particular system. Stability of the metering circuit may be provided by the use of a triode 32 having a grounded grid, as shown, or by equivalent means.

The impulse generator is not an absolute standard, but gives an output which is a periodic signal with none of the properties of "white" noise, and its noise figure is a function of band width. In FIG. 3a is shown the noise power for a 3-megacycle band width, whereas the noise power is indicated for a 2-megacycle band width in FIG. 3b. If these pulses are peak detected, the magnitude would be relatively independent of band width, and yet it may be seen from these figures that the noise power present in the 3-megacycle pass band is much greater than that in the 2-megacycle pass band.

Hence if the impulse generator is calibrated against a standard noise source and peak detected, it provides a high power secondary standard which may be shown to be directly related to the noise figure in decibels above $KT\Delta f$, where $\Delta f$ is the limiting band width of the receiver, T is the absolute temperature of the input impedance, and K is Boltzman's constant, or $1.38 \times 10^{-23}$ watt-seconds per degree absolute.

The noise figure may then be taken as the ratio to $KT\Delta f$ of the minimum input signal for which the output signal and noise are equal. This ratio is utilized in the vacuum tube voltmeter portion, indicated generally as 30, where noise is applied to the triode 31 controlled by signals from the system being tested through cathode follower 40 and input switch 41. This system noise is measured by meter 42, which is stabilized by the use of a triode 32 having its grid 34 grounded at 35. The triode 32 is an auxiliary balancing tube which prevents zero drift due to potential variations at the anode. Alternatively, an arrangement of fixed resistances, not shown, may be used to provide a stable meter return.

In operation, the charging voltage is adjusted by means of the control arm 21 to give a standard selected output level, while the meter current and meter biasing is set to give an expanded meter reading for receivers having noise figures in the normal ranges, as explained hereafter.

The impulse generator signal fed through coupling means 2 into the mixer waveguide 4 is adjusted by varying the probe type couplers, not shown, to give an indication on meter 42 corresponding to the noise figure of the system. This figure has previously been measured with a primary standard, for example, of the gas discharge type. The impulse generator is then calibrated, and will read the correct noise figure for any mixer crystals and preamplifiers.

The noise output of the system, obtained from the cathode follower 40 after having been inserted through the preamplifier, IF amplifier and video detector 71, is passed through a diode peak detector 46 having a coupling condenser 47, a grounded diode 48, a resistance 49, and a capacitor 54 grounded at 53. A voltage divider network 50 having a pair of equal resistances 51 and 52 is bridged across capacitor 54. The time constant of the peak detector circuit is primarily determined by the capacitance 47, and to a lesser extent by that of capacitance 54. The high side of the divider 50 is connected to a first contact 55 of a three-pole two-position momentary-depress type of sensitivity switch indicated generally as 56, while the divider midpoint 57 is connected to a second contact 59. The sensitivity switch contact arm 60 is thus able to connect the output, reduced by passage through network 46, from the cathode follower 40 to the grid 61 of tube 31 in normal position, and half that output potential to the grid 61 when the switch 56 is depressed.

When the sensitivity push button switch 56 is depressed, the 300-volt direct-current charging potential from a line 67 is connected to the voltage divider 22 through a second switch arm 69 on the sensitivity switch. Simultaneously, a third sensitivity switch arm 70 connects 400-cycle solenoid actuating current from a 6.3-volt source, not shown, through line 71 to the winding 20, producing vibration of the switch reeds 12 and 14. The noise figure in decibels may then be read directly on the meter 42.

The procedure for reading noise figure such as used in the embodiment associated with a particular radar system is as follows: first, the meter is zeroed by adjusting the zeroing potentiometer 76: during this step the input to the cathode follower 40 is removed by opening the input switch 41; next, the switch 41 is closed, and the receiver noise level at the output of the video cathode follower 40 is set at a standard level by adjusting the bias of the IF amplifier stage shown in block 89 of FIG. 4, as described later. The peak detector 46, the vacuum tube voltmeter unit 30, and the circuits necessary to supply coil driving and line charging voltages are as shown in FIG. 1. In the normal position of the sensitivity switch 56, as shown in FIG. 1, the output of receiver noise is detected by the peak detector 46, and applied to the grid 61 of the first tube 31 of the vacuum tube voltmeter unit 30. The zeroing potentiometer 76, which in a particular embodiment had the value of 100 kilohms, has associated therewith potentiometer resistances 77 and 79 of 51 kilohms each. In order to provide greater ease in reading the meter, it may be set to zero when switch 41 in open, as described above. Switch 41 is then closed and the IF gain control (not shown) adjusted for full-scale deflection of the meter, here 100 microamps. Next, the zeroing potentiometer 76 is adjusted to reduce the meter reading to 10 decibels, here 30 microamps. With the meter thus calibrated, pressing the button 56 will give a reading on an expanded scale. That is, the pointer will now move from 30 to 70, or 40 microamps, to register a 3-decibel reduction in noise factor. This compares with a change of meter reading from 50 to 70 microamps, or a difference of only 20 microamps, to register the same 3-decibel noise factor reduction, had not the expanded scale been used.

When the sensitivity switch 56 is depressed, the 400-cycle driving voltage is applied through driving voltage line 71 and contact 72 to the solenoid coil 20 through the switch contact arm 70. Simultaneously, through the second switch arm 69, the 300-volt charging potential is applied to charge the transmission line defined by the outer conductor 11, the resistance 10, and reed 12 through the charging voltage dividing potentiometer 22, and the potential applied to the grid 61 of vacuum tube 31 is cut in half by the shifting of sensitivity switch contact arm 60 from a contact 55 to contact 59, which connects the grid 61 to the midpoint 57 of the voltage divider network 50 disposed across the output of the peak detector 46. The noise figure may then be read on meter 42. For receivers having noise figures better than 10 decibels, the meter 42 will read up-scale from the 10-decibel line, and for receivers having noise figures worse than 10 decibels, the meter will read down-scale from the 10-decibel line.

This method may be used to measure noise figure even in the presence of jamming signals when combined with the remainder of the circuitry shown in FIG. 4. Jamming signals may be signals from other radar systems, for example, whether produced inadvertently or intentionally. The blocking oscillator is triggered by pulses derived from junction 26 and fed through lead 27 to the blocking oscillator 29. The latter supplies pulses to the gating diodes 80 which prevent the peak detector from passing jamming signals when measurements of noise figure are being made. In this circuit, an average detector 81 is used alternatively with the peak detector 46, to receive random noise from a video amplifier 82 comprising cathode follower 40 to set the reference level, under the control of a switch 84.

From the above description, it will appear that there has been provided a small, compact unit for determining the noise figure of a radar receiver which requires little power and which may be readily operated by relatively unskilled personnel to determine the state of efficiency of the radar receiver, and hence the range of operation of the radar system.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an impulse noise generator, the combination comprising means for generating noise, having electrical storage means; means for providing charging voltage to said storage means; means for generating an alternating magnetic field about said storage means; means responsive to said alternating field for discharging said storage means into a receiver; electromagnetic energy absorbing means positioned about said storage means for making the discharged output thereof substantially uniform over a broad frequency band; peak detector means for sensing discharges of said storage means at the output of said receiver; and means for determining the magnitude of said discharges and displaying such magnitudes in terms of receiver noise figure.

2. In an impulse noise generator for use in checking receiver sensitivity of a radar receiver, the combination comprising means for generating noise, having electrical storage means; means for providing a charging voltage to said storage means; means for setting up an alternating magnetic field about said storage means; magnetically-actuatable means for periodically discharging said storage means, the output of said storage means being coupled to said receiver; means for deriving a trigger signal from said noise generator; peak detector means; means responsive to said trigger signal for gating the output of said receiver to said detector means to enable receiver sensitivity measurement in the presence of interfering signals; and means for determining the magnitude of peak potentials passed by said peak-detector means.

3. In an impulse noise generator for testing microwave receiver response, the combination of a receiver and means for generating electrical noise, comprising a coaxial line having a chargeable center conductor with interruptible contacts; means for supplying direct-current charging potential to said center conductor; electromagnetic means for creating a field through said center conductor adapted to actuate said contacts; means for supplying alternating-current to said electromagnetic means; resistance means for permitting discharge of said center conductor when said contacts are actuated by said field; means for applying said discharge to the input of said receiver; means for peak-detecting the output of said receiver in cooperation with a vacuum tube voltmeter circuit reference source; means for stabilizing said vacuum tube voltmeter circuit output; and means for presenting the output of said vacuum tube voltmeter in terms of receiver noise figure.

4. In an impulse noise generator for testing microwave receiver response, the combination of an open-circuited transmission line comprising a coaxial line having an inner conductor adapted to receive an electrical charge and to be interrupted by electromagnetic fields applied thereabout; an outer conductor adapted to enclose said interruptible inner conductor and to have wound thereabout an electromagnetic coil; an absorbing member fabricated of a highly electrically resistant material positioned between said inner and outer conductors; means for applying an alternating-current to said electromagnetic coil; means for applying pulses from said line as an input to a receiver to be tested; means for recognizing said pulses in the output of said receiver; and means for presenting the output of such pulses as a measure of the noise figure of said receiver.

5. In an impulse noise generator for testing microwave receiver response, the combination of means comprising an electromagnetically actuable dry reed switch arranged to act as the center conductor of an open-circuited coaxial transmission line, and to receive an electrical charge thereon; absorbing means at least partially surrounding said dry reed switch for making the output of said noise generator substantially uniform over a wide frequency band; means surrounding said switch arranged to act as the outer conductor of said coaxial line; a coil winding disposed about said outer conductor and adapted to be energized to set up an electromagnetic field through said dry reed switch center conductor which will cause periodic opening and closing thereof; means for applying pulses produced by said periodic opening and closing to the input of a receiver to be tested; means for peak-detecting at the output of said receiver pulses resulting from such pulse application to the input of said receiver; and means for presenting the peak-detected output of said receiver in terms of receiver efficiency.

6. In an impulse noise generator for testing microwave receiver response, the combination of a transmission line having a pair of magnetically-actuable dry contact reeds; means for actuating said reeds to charge and discharge said line periodically through a high resistance and low impedance respectively; means for introducing electrical noise resulting from such charging and discharging as an input to a receiver to be tested; means for peak-detecting the output of said receiver in cooperation with a vacuum tube voltmeter circuit; means for stabilizing said voltmeter circuit; triggering means associated with said means for introducing electrical noise; gating means actuated by said triggering means to permit measurement despite the presence of jamming signals at the input to said receiver during noise measurements; and means for presenting the output of said voltmeter in terms of receiver noise figure.

7. In a system for measuring the sensitivity of a radar receiver, a noise generator having a chargeable central member interruptible by electromagnetic forces; means for supplying direct-current charging voltages to said central member; coil means for setting up a magnetic field about said central member; an alternating-current supply adapted to set up an alternating-current field in said coil; a blocking oscillator responsive to said noise generator, a quasi-peak detector having a diode gate associated therewith, said diode gate being responsive to said blocking oscillator for controlling said peak detector; vacuum tube voltmeter means responsively connected to said peak detector; and means for isolating the impedance of the sensitivity measuring system from the output impedance of said radar receiver, comprising a video amplifier disposed between said receiver and said detector.

8. In a system for measuring the sensitivity of a radar receiver, a noise generator having a chargeable inner conductor adapted to be interrupted by magnetic means; trigger means associated therewith; means for supplying direct-current charging voltages to said inner conductor; an outer conductor disposed about said inner conductor; coil means disposed about said outer conductor; means for setting up an alternating electromagnetic field through said coil means; means for inserting pulses from said generator into the receiver to be tested; a blocking oscillator responsive to said trigger means a quasi-peak detector having a diode gate associated therewith, and connected to the output of said receiver, said diode gate being responsively connected to the blocking oscillator for controlling said peak detector; vacuum tube voltmeter means adapted to receive the output of said detector; and means for isolating the impedance of the sensitivity measuring system from the output impedance of the receiver, comprising a cathode follower.

9. In a system for measuring the sensitivity of a radar receiver, a noise generator having a chargeable inner conductor adapted to be interrupted by electromagnetic means; means for supplying direct-current charging voltages to said inner conductor; an outer conductor surrounding said inner conductor; a coil winding disposed about said outer conductor; an alternating-current line supply adapted to set up an alternating field in said coil winding; directional coupling means for tying said generator into said radar receiver system; a blocking oscillator responsive to said noise generator; a quasi-peak detector having a diode gate associated therewith, and, adapted to receive impulses from said receiver, said diode gate being responsively connected to the blocking oscillator for controlling said peak detector; means for isolating the impedance of the sensitivity measuring system from the output impedance of the radar receiver; and vacuum tube voltmeter means connected to the output of said detector through a cathode follower and calibrated in receiver noise figure terms.

10. In a system for measuring the sensitivity of a radar receiver, a noise generator having a chargeable inner member interruptible by electromagnetic force; direct-current supply means constituting a charging voltage source for said chargeable member and having a direct-current return through said noise generator; an outer conductor disposed about said inner member; a coil winding disposed about said outer conductor; an alternating-current supply adapted to set up an alternating field in said coil; the output of said noise generator being fed to said receiver; a quasi-peak detector; a gate generator responsive to the output of said noise generator; a diode gate controlled by said gate generator interposed between said receiver and said peak detector; vacuum tube voltmeter means responsively connected to said peak detector; and means for isolating the impedance of the sensitivity measuring system from the output impedance of the radar receiver.

11. In a system for measuring the sensitivity of a radar receiver, a noise generator adapted to produce electrical noise by the alternate charging and discharging of a central conductor through a resistance; means for supplying direct-current charging potential to said center conductor; an outer conductor disposed about said inner conductor; a coil disposed about said outer conductor; an alternating-current supply adapted to energize said coil; means for electromagnetically controlling the charging and discharging of said central conductor; a gate generator responsive to said noise generator a quasi-peak detector having a diode gate associated therewith, said diode gate being responsively connected to said gate generator for controlling said peak detector; sensitivity measuring means comprising a vacuum tube voltmeter responsive to said peak detector and calibrated in terms of receiver noise figure; means for isolating the output impedance of said radar receiver from the impedance of the sensitivity measuring system; and sensitivity switching means arranged in one position for the simultaneous application of charging potential to said center conductor, alternating field current to said coil, and a reduced output from said detector to said sensitivity measuring means, said switching means being arranged in a second position solely for the application of the output of said detector to said sensitivity measuring means.

12. An impulse noise generator comprising a section of coaxial transmission line having distributed capacitance; a magnetically controlled switch disposed in the circuit of the conductor of the inner conductor of said transmission line and within the outer conductor of said transmission line; a cylindrical absorbing member fabricated of highly resistant material interposed between the inner and outer conductors of said transmission line; means for charging the capacitance of said transmission line through a high resistance; and means for discharging said capacitance through an impedance of substantially the characteristic impedance of said transmission line.

13. Means for testing the sensitivity of a radar receiver, comprising: a noise generator inclding a coaxial line having reeds mounted therein, D.-C. charging means cooperating in circuit with said reeds for charging said coaxial line, A.-C. means for magnetically actuating said reeds to produce a test signal comprising electrical noise impulses, an electromagnetic energy absorbing member situated between an inner and outer conductor of said coaxial line to provide a uniform noise signal over a relatively wide frequency band, a peak detector responsively coupled to said receiver, and means interposed between said peak detector and said receiver for minimizing signal interference from other signal sources when the test signal from said coaxial line is fed to the receiver, comprising a gating circuit responsively coupled to said noise generator for coupling the output of the receiver to the peak detector only when the noise generator is producing a test signal.

References Cited in the file of this patent

UNITED STATES PATENTS

| 2,620,438 | Coatsworth | Dec. 2, 1952 |
| 2,671,896 | De Rosa | Mar. 9, 1954 |
| 2,769,909 | Radmacher | Nov. 6, 1956 |
| 2,773,186 | Herrmann | Dec. 4, 1956 |
| 2,797,329 | George | June 25, 1957 |
| 2,901,696 | Mollfors | Aug. 25, 1959 |